UNITED STATES PATENT OFFICE.

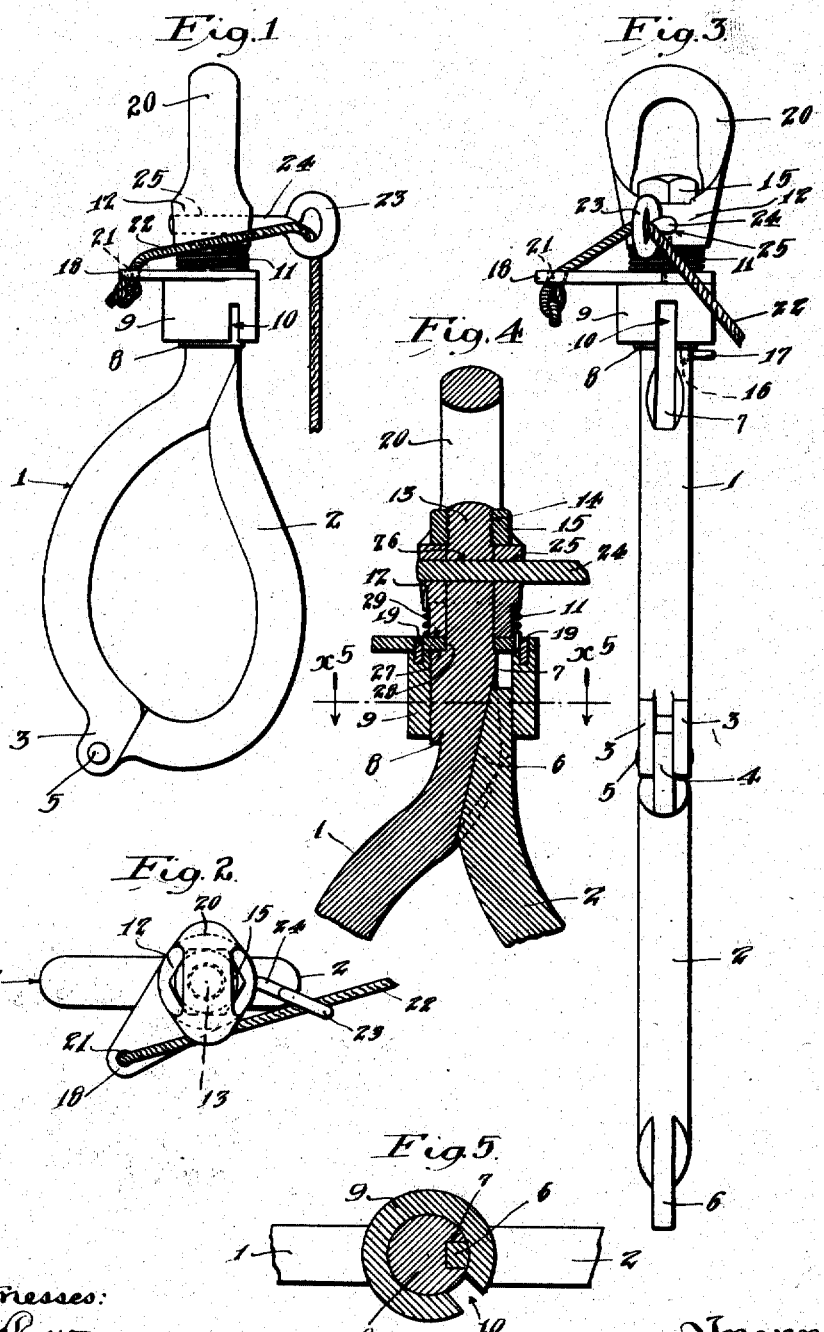

CHARLES J. COULTER, OF LONG BEACH, CALIFORNIA, ASSIGNOR OF ONE-HALF TO OSWELL T. ELLIS, OF LONG BEACH, CALIFORNIA.

GRAPPLE.

1,303,033.   Specification of Letters Patent.   Patented May 6, 1919.

Application filed September 28, 1916. Serial No. 256,131.

*To all whom it may concern:*

Be it known that I, CHARLES J. COULTER, a citizen of the United States, residing at Long Beach, in the county of Los Angeles and State of California, have invented a new and useful Grapple, of which the following is a specification.

This invention relates to a grapple in the form of a releasable eye adapted to be used in connection with a block and tackle for raising and lowering loads and an object of the invention is to produce a grapple of this type of maximum simplicity combined with strength.

Another object is to so construct the grapple that the load will aid in opening it when the latch is released.

Other objects and advantages will appear in the subjoined detailed description.

The accompanying drawings illustrate the invention.

Figure 1 is a side elevation of a grapple constructed in accordance with the provisions of this invention.

Fig. 2 is a plan view of Fig. 1.

Fig. 3 is an elevation from the right of Fig. 1, the releasable arm being shown in open position.

Fig. 4 is an enlarged vertical mid section of the upper part of the grapple, the parts being in the position shown in Fig. 1.

Fig. 5 is a plan section on line indicated by $x^5-x^5$, Fig. 4.

There are provided two outwardly convex arms 1, 2, the arm 1 having ears 3 and the arm 2 having an ear 4 inserted between the ears 3 and pivotally connected to said ears 3 by a pivot 5. The arms 1, 2 are so constructed that the pivot 5 is located on one side of the longitudinal axis of the grapple, the arm 2 being hook-shaped so that when a line fastened to a load is passed through the eye formed by the arms 1, 2 said line will be supported only by the arm 2. The arm 2 is adapted to be held in closed position and for this purpose is provided at its free end with a tongue 6 adapted to be accommodated in a groove 7 in the arm 1.

The arm 1 adjacent the groove 7 forms a bearing 8 for a rotative sleeve 9 which is provided with a slot 10 adapted, by appropriate turning of the sleeve, to be brought into registration with the groove 7 so that the tongue 6 can readily be inserted in or withdrawn from the groove 7 to close or open the grapple. The sleeve 9 is normally held with its slot 10 out of registration with the groove 7 by a coil spring 11 surrounding a collar 12 through which the straight shank 13 of the arm 1 extends, said shank being threaded at 14 to receive a nut 15 bearing against the collar so as to hold the arm 1 and collar 12 assembled. One end of the spring 11 is fastened in the sleeve 9 and the other end of said spring is fastened in the collar 12. The spring 11 is under sufficient tension to turn the sleeve with its slot 10 out of registration with the groove 7, and there is an abutment in the form of a pin 16 projecting down from the collar adapted to engage an abutment 17 in the form of a pin extending laterally from the arm 1. The pins 16, 17 constitute a stop to limit rotation of the sleeve 9 by the spring 11. To turn the sleeve 9 against the power of the spring 11, said sleeve is provided with an arm 18 extending laterally therefrom and said arm may be an integral part of the sleeve or, as shown in the drawings, may be fastened in place by pins 19, thus forming, functionally, a part of the sleeve.

The collar 12 forms the shank portion of an eye 20 whereby the grapple may be fastened to a block or tackle. The outer end of the arm 18 is provided with a perforation 21 through which passes an operating line 22, said line being rove through an eye 23 formed on the outer projecting end of a pin 24 inserted through a hole 25 in the collar 12. The pin 24 is also inserted through a hole 26 in the shank 13 and thus aids in securing the arm 1 to the collar 12.

The shank 13 is of less diameter than the bearing 8 and thus there is formed an annular shoulder 27 against which seats an annular shoulder 28 inside of the sleeve 9. This prevents endwise movement of the sleeve downwardly and the lower end of the collar 12 forms a shoulder 29 adapted to engage the upper end of the sleeve to prevent endwise movement of the sleeve upwardly.

Assuming that the eye 20 of the grapple is connected to a block or tackle or to any other means whereby the grapple may be used in lifting and lowering loads and assuming that the arm 2 is in open position as in Fig. 3, a rope or chain, not shown, connected with the load to be hoisted is looped around the arm 2 and the arm 20 is then swung into closed position, the sleeve 9 being turned sufficiently for this purpose to register the slot 10 with the groove 7, after which the sleeve is released and the spring 11 turns the sleeve to close the groove. The load is then raised and swung or carried to the position desired and is then lowered and when it is desired to release the load, the operator will pull on the line 22 to turn the sleeve 9 to bring the slot 10 into registration with the groove 7, whereupon the weight of the arm 2 and weight of the load thereon will cause the arm 2 to swing downwardly on its pivot 5 to position shown in Fig. 3. This of course releases the rope or chain which was looped around the arm 2.

The grapple may also be used with good results in place of the ordinary davit-hooks so that if for any reason it is desirable or necessary the boat may be quickly released from both of the davits simultaneously, before or as the boat strikes the water.

I claim:

1. A grapple comprising an arm having a groove, a second arm pivoted to the first arm and having a tongue to engage in the groove, the arms together forming an eye when the tongue is in the groove, a sleeve rotatably mounted on the first arm at the groove and provided with a slot adapted to be brought into registration with the groove, and means yieldingly holding the sleeve turned with the slot out of registration with the groove.

2. A grapple comprising an arm having a groove, a second arm pivoted to the first arm and having a tongue to engage in the groove, the arms together forming an eye when the tongue is in the groove, the second arm being in the form of a hook and the pivot being to one side of the longitudinal axis of the grapple, and a sleeve rotatively mounted on the first arm at the groove and provided with a slot adapted to be brought into registration with the groove, and means yieldingly holding the sleeve turned with the slot out of registration with the groove.

3. A grapple comprising an arm having a groove, a second arm pivoted to the first arm and having a tongue to engage in the groove, the arms together forming an eye when the tongue is in the groove, a sleeve rotatively mounted on the first arm at the groove and provided with a slot adapted to be brought into registration with the groove, a spring to turn the sleeve with the slot out of registration with the groove, the sleeve having a laterally projecting arm, an eye connected with the first named arm, and a line fastened to the arm and rove through the last named eye.

4. A grapple comprising curved arms, a pivot connecting the arms together at one end, and means to releasably hold the arms together at the other end, said means including a rotative member having a slot, the arms when in closed position forming an eye, one of the arms being in the form of a hook and the pivot being to one side of the longitudinal axis of the grapple so that when the grapple is upright a line passing through the eye will rest only on the hook-shaped arm, said hook-shaped arm having a tongue adapted to pass through the slot.

5. A grapple comprising a curved arm having a bearing at its upper end and having a groove extending into the bearing and having a shank and a shoulder, a sleeve journaled on the bearing and provided with a slot adapted to be brought into registration with the groove and having an internal annular shoulder seated against the first named shoulder, a second curved arm pivoted to the first named arm and having a tongue to pass through the slot and enter the groove, an eye having a collar through which the shank of the first arm projects, said collar forming a shoulder to engage the sleeve, a nut threaded on the shank and bearing against the outer end of the collar, a coil spring on the collar fastened at one end to the collar and at its opposite end to the sleeve, a stop to limit rotation of the sleeve by the spring, and means to effect rotation of the sleeve against the power of the spring to cause the slot to be brought into registration with the groove.

Signed at Los Angeles, California, this 23d day of September, 1918.

CHARLES J. COULTER.

Witnesses:
GEORGE H. HILES,
L. BELLE WEAVER.

Copies of this patent may be obtained for five cents each, by addressing the "Commissioner of Patents, Washington, D. C."